United States Patent
Handshaw et al.

(10) Patent No.: US 12,248,846 B1
(45) Date of Patent: Mar. 11, 2025

(54) ENHANCING PERFORMANCE OF HIGH RESOLUTION VISION SYSTEMS

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/524,034

(22) Filed: Nov. 30, 2023

(51) Int. Cl.
- *G06K 7/14* (2006.01)
- *G06T 3/40* (2024.01)
- *G06V 10/25* (2022.01)
- *G06V 10/26* (2022.01)

(52) U.S. Cl.
CPC .............. *G06K 7/1443* (2013.01); *G06T 3/40* (2013.01); *G06V 10/25* (2022.01); *G06V 10/267* (2022.01)

(58) Field of Classification Search
CPC ........ G06K 7/1443; G06T 3/40; G06V 10/25; G06V 10/267; G06Q 30/0185
See application file for complete search history.

(56) References Cited

U.S. PATENT DOCUMENTS

| | | | |
|---|---|---|---|
| 6,445,822 B1 * | 9/2002 | Crill | G06T 7/00 |
| | | | 707/E17.02 |
| 10,839,181 B1 * | 11/2020 | Fjellstad | G07G 3/003 |
| 11,082,668 B2 * | 8/2021 | Kanga | H04N 7/188 |
| 11,335,077 B1 * | 5/2022 | Salmani Rahimi | G06T 19/20 |
| 11,727,229 B1 * | 8/2023 | Lupo | G06K 7/1443 |
| | | | 235/462.14 |
| 11,734,528 B1 * | 8/2023 | Handshaw | G06K 7/10752 |
| | | | 235/462.41 |
| 11,983,845 B1 * | 5/2024 | Frank | G06F 3/04842 |
| 12,039,398 B1 * | 7/2024 | Kotlarsky | G06K 7/1443 |
| 12,131,218 B2 * | 10/2024 | Barkan | G06K 7/1096 |
| 2006/0159367 A1 * | 7/2006 | Zeineh | G02B 21/365 |
| | | | 382/128 |
| 2009/0022429 A1 * | 1/2009 | Longacre, Jr. | G06V 30/142 |
| | | | 382/313 |
| 2009/0272801 A1 * | 11/2009 | Connell, II | G06Q 10/087 |
| | | | 235/383 |

(Continued)

*Primary Examiner* — Daniel I Walsh

(74) *Attorney, Agent, or Firm* — Yuri Astvatsaturov

(57) ABSTRACT

Devices, systems, and methods for operating an indicia reader. An example system includes an imaging assembly, at least one processor and memory storing instructions that cause the processor to: capture and store in memory one or more images comprising image data; generate one or more lower resolution images comprising lower resolution image data corresponding to the one or more images; analyze the lower resolution image data to detect an object of interest; in response to detecting the object of interest and having the object meet a predetermined condition, determine a region of interest in the one or more lower resolution images corresponding to the object; access the one or more images from memory; generate cropped image data by cropping the one or more images to include the region of interest; analyze the cropped image data to determine information corresponding to the object; and transmit a message to a host.

17 Claims, 7 Drawing Sheets

(56) References Cited

U.S. PATENT DOCUMENTS

| | | | |
|---|---|---|---|
| 2015/0144693 A1* | 5/2015 | Li | G06K 7/10722 |
| | | | 235/437 |
| 2017/0061184 A1* | 3/2017 | Wang | G06V 30/224 |
| 2018/0365462 A1* | 12/2018 | Gutfinger | G06K 7/1443 |
| 2019/0205700 A1* | 7/2019 | Gueguen | G06T 3/40 |
| 2021/0042528 A1* | 2/2021 | Kundy | G07G 1/0054 |
| 2021/0110123 A1* | 4/2021 | Brock | G06K 7/1413 |
| 2021/0266458 A1* | 8/2021 | Nayak | G06V 10/22 |
| 2021/0272318 A1* | 9/2021 | Conticello | G06N 3/045 |
| 2021/0279436 A1* | 9/2021 | Barkan | G06K 7/10881 |
| 2021/0295078 A1* | 9/2021 | Barkan | G06V 30/2247 |
| 2022/0019830 A1* | 1/2022 | Mironica | G06V 10/443 |
| 2022/0147751 A1* | 5/2022 | Vitek | G06V 10/82 |
| 2022/0303445 A1* | 9/2022 | Skaff | H04N 23/57 |
| 2023/0037427 A1* | 2/2023 | Brakob | G06Q 20/208 |
| 2023/0215000 A1* | 7/2023 | Meng | A61B 8/466 |
| | | | 600/443 |
| 2023/0316019 A1* | 10/2023 | Handshaw | G06K 7/10881 |
| | | | 235/472.01 |
| 2023/0385572 A1* | 11/2023 | Barkan | G06K 7/10732 |
| 2024/0037358 A1* | 2/2024 | Barkan | G06K 7/1096 |
| 2024/0037527 A1* | 2/2024 | Handshaw | G06Q 20/206 |
| 2024/0040264 A1* | 2/2024 | Astvatsaturov | G06V 10/70 |
| 2024/0111975 A1* | 4/2024 | Barkan | G06K 7/10722 |
| 2024/0112361 A1* | 4/2024 | Wilfred | G06T 7/62 |
| 2024/0143955 A1* | 5/2024 | Goren | G06K 7/1093 |
| 2024/0211712 A1* | 6/2024 | Barkan | G06K 7/1096 |
| 2024/0220957 A1* | 7/2024 | Patil | G06V 10/25 |
| 2024/0220999 A1* | 7/2024 | Gao | G06Q 20/208 |
| 2024/0256025 A1* | 8/2024 | Barkan | G06F 1/3296 |
| 2024/0289569 A1* | 8/2024 | Barish | G06K 7/1417 |
| 2024/0289604 A1* | 8/2024 | Kotlarsky | G06K 7/1443 |
| 2024/0289764 A1* | 8/2024 | Astvatsaturov | G06K 7/1443 |

\* cited by examiner

ENHANCING PERFORMANCE OF HIGH RESOLUTION VISION SYSTEMS

BACKGROUND

Imaging systems, such as a bioptic indicia reader, are commonly utilized in retail and other locations to facilitate customer checkout, such as when identifying and/or recognizing an item passed across a scanning area, or decoding the barcode of the item, among other things. Such imaging systems may include a vision camera having an image sensor which produces higher resolution images than are needed in the most typical situations for which the images are used, such as object recognition/identification and/or indicia decoding. When capturing, storing, analyzing, transmitting and/or otherwise processing the image data of the full and/or higher resolution images, components and/or infrastructure of the imaging system may be, or become, compromised, e.g., data buses, cables, memories, networks and the like having limited bandwidth, storage capacity, throughput or other characteristics resulting in degraded performance, if not failure, when processing higher resolution image data. Moreover, processors, module, programs, algorithms, models, and the like may also experience a degradation in performance or failure when processing the higher resolution image data. As image sensor technology advances to produce sensors with even higher resolution, any deleterious effects already being experienced by the imaging system from high resolution image data will only be exacerbated.

One way to compensate for the technical challenges higher resolution images create for an imaging system may be to generate corresponding lower resolution images which remain adequate for some use cases of the system and also provide more efficient transmission, processing, etc., of the lower resolution image data due to its more manageable size. However, while the lower resolution images may be adequate for some typical use cases of the imaging system, situations may likely be encountered where the higher resolution images are preferred, if not necessary, for an intended purpose. For example, successful identification of an object based upon its distinguishing features in a higher resolution image captured by the vision camera may not be possible if reducing the resolution of the image causes such features to become indistinguishable. Although, if using the full resolution image includes processing far more image data by the imaging system than is required to identify the object of interest, the full resolution image data may prove to be just as problematic.

Accordingly, there is a need for an imaging system which produces images and/or image data of a resolution, quality, size, or other suitable characteristic(s) and the like which are adequate for an intended purpose without unnecessarily degrading or impacting the performance of the imaging system.

SUMMARY

Accordingly, at least some embodiments of the present invention are directed to improved systems and methods of operating an imaging system ("system"), such as an indicia reader. The system may capture one or more higher resolution images via an imaging assembly, and generate one or more corresponding lower resolution images for further use by the system, for example decoding an indicia captured in the images, detecting an object in the images, identifying an object in the images, etc. However, when the lower resolution images are inadequate for an intended purpose or otherwise unfavorable, the system may crop the corresponding one or more higher resolution images around a detected region of interest to generate one or more cropped images. The cropped image(s) may beneficially include the region of interest at the higher resolution, while excluding extraneous portions outside the region of interest which may likely be non-essential for the intended purpose or otherwise unnecessary, while also having a reduced amount of data as compared to the higher resolution image data. The cropped images may reduce the amount of data the system is required to communicate, store, analyze, transmit, and/or otherwise process, to provide technical advantages such as more efficient operation of the system, increased performance of the system, reduced consumption of system resources (e.g., bandwidth, power, memory, processing, etc.), as well as an enhanced checkout experience (e.g., faster checkout, increased chance of product identification or indicia decode, etc.) for the customer.

For example, in an embodiment the present invention is a method for operating an indicia reader. The method includes capturing by a first imaging assembly, one or more images comprising image data of a field of view of the first imaging assembly; storing the image data in a memory associated with the indicia reader; generating one or more lower resolution images comprising lower resolution image data corresponding to the one or more images comprising image data; analyzing the lower resolution image data to detect an object of interest; determining a region of interest in the one or more lower resolution images of the lower resolution image data corresponding to the object of interest based upon detecting the object of interest and having the object of interest meet a predetermined condition; accessing the image data of the one or more images from the memory based upon determining the region of interest; generating cropped image data by cropping the one or more images to include the region of interest; analyzing the cropped image data to determine information corresponding to the object of interest; and transmitting a message to a host, the message being based at least in part on the information corresponding to the object of interest.

In a variation of this embodiment, the method includes at least two processors which are communicatively coupled, wherein at least one processor is an image processing unit.

In another variation of this embodiment, the predetermined condition is an unsuccessful identification of the object.

In yet another variation of this embodiment, the method may include capturing one or more initial images comprising initial image data of the object of interest, by a second imaging assembly having a second field of view which at least partially overlaps the field of view; analyzing the initial image data to decode an indicia associated with the object of interest in the initial image data resulting in a decoded indicia value; based upon the decoded indicia value, generating a message indicating ticket switching; and determining the region of interest is proximate the indicia.

In still another variation of this embodiment, generating the one or more lower resolution images further comprises binning pixels of the one or more images.

In a variation of this embodiment, the method may include obtaining cropping parameters used to generate the cropped image data.

In another variation of this embodiment, the method may include analyzing the region of interest in the image data of the one or more images to determine information corresponding to the object of interest.

In yet another variation of this embodiment, determining a region of interest in the one or more lower resolution images may include detecting the object of interest in the lower resolution image data using one or more of edge detection, pattern matching, segmentation, color analysis, optical character recognition, or blob detection.

In still another variation of this embodiment, identifying the object of interest occurs locally on the indicia reader.

In a variation of this embodiment, analyzing the cropped image data to determine information corresponding to the object of interest may further include decoding an indicia associated with the object of interest in the cropped image data, resulting in a decoded indicia value; and transmitting the decoded indicia value to the host.

In another embodiment, the present invention is a system for operating an indicia reader. The system may include a first imaging assembly having a field of view configured to capture one or more images comprising image data; one or more processors; and a memory associated with the indicia reader storing instructions that, when executed by the one or more processors, cause the one or more processors to: capture the one or more images; store the image data in the memory; generate one or more lower resolution images comprising lower resolution image data corresponding to the one or more images comprising image data; analyze the lower resolution image data to detect an object of interest; in response to detecting the object of interest and having the object of interest meet a predetermined condition, determine a region of interest in the one or more lower resolution images of the lower resolution image data corresponding to the object of interest; in response to determining the region of interest, access the image data of the one or more images from the memory; generate cropped image data by cropping the one or more images to include the region of interest; analyze the cropped image data to determine information corresponding to the object of interest; and transmit a message to a host, the message being based at least in part on the information corresponding to the object of interest.

In a variation of this embodiment, the system may include at least two processors which are communicatively coupled, wherein at least one processor is an image processing unit.

In another variation of this embodiment, the predetermined condition is an unsuccessful identification of the object.

In a yet another variation of this embodiment, the system may include a second imaging assembly having a second field of view which at least partially overlaps the field of view and is configured to capture one or more initial images comprising initial image data of the object of interest, wherein the one or more processors are further configured to: capture the one or more initial images of the object of interest; analyze the initial image data to decode an indicia associated with the object of interest in the initial image data resulting in a decoded indicia value; based upon the decoded indicia value, generate a message indicating ticket switching; and determine the region of interest is proximate the indicia.

In still another variation of this embodiment, to generate the one or more lower resolution images, the one or more processors are further configured to bin pixels of the one or more images.

In another variation of this embodiment, the one or more processors are further configured to obtain cropping parameters used to generate the cropped image data.

In still another variation of this embodiment, the one or more processors are further configured to analyze the region of interest in the image data of the one or more images to determine information corresponding to the object of interest.

In yet another variation of this embodiment, to determine a region of interest in the one or more lower resolution images, the one or more processors are further configured to detect the object of interest in the lower resolution image data using one or more of edge detection, pattern matching, segmentation, color analysis, optical character recognition, or blob detection.

In still another variation of this embodiment, to analyze the cropped image data to determine information corresponding to the object of interest, the one or more processors are further configured to: decode an indicia associated with the object of interest in the cropped image data resulting in a decoded indicia value; and transmit the decoded indicia value to a host.

In another embodiment, the invention is a tangible machine-readable medium comprising instructions that, when executed, cause a machine to at least: capture by a first imaging assembly, one or more images comprising image data of a field of view of the first imaging assembly; store the image data in a memory associated with an indicia reader; generate one or more lower resolution images comprising lower resolution image data corresponding to the one or more images comprising image data; analyze the lower resolution image data to detect an object of interest; in response to detecting the object of interest and having the object of interest meet a predetermined condition, determine a region of interest in the one or more lower resolution images of the lower resolution image data corresponding to the object of interest; in response to determining the region of interest, access the image data of the one or more images from the memory; generate cropped image data by cropping respective one or more images to include the region of interest; analyze the cropped image data to determine information corresponding to the object of interest; and transmit a message to a host, the message being based at least in part on the information corresponding to the object of interest.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
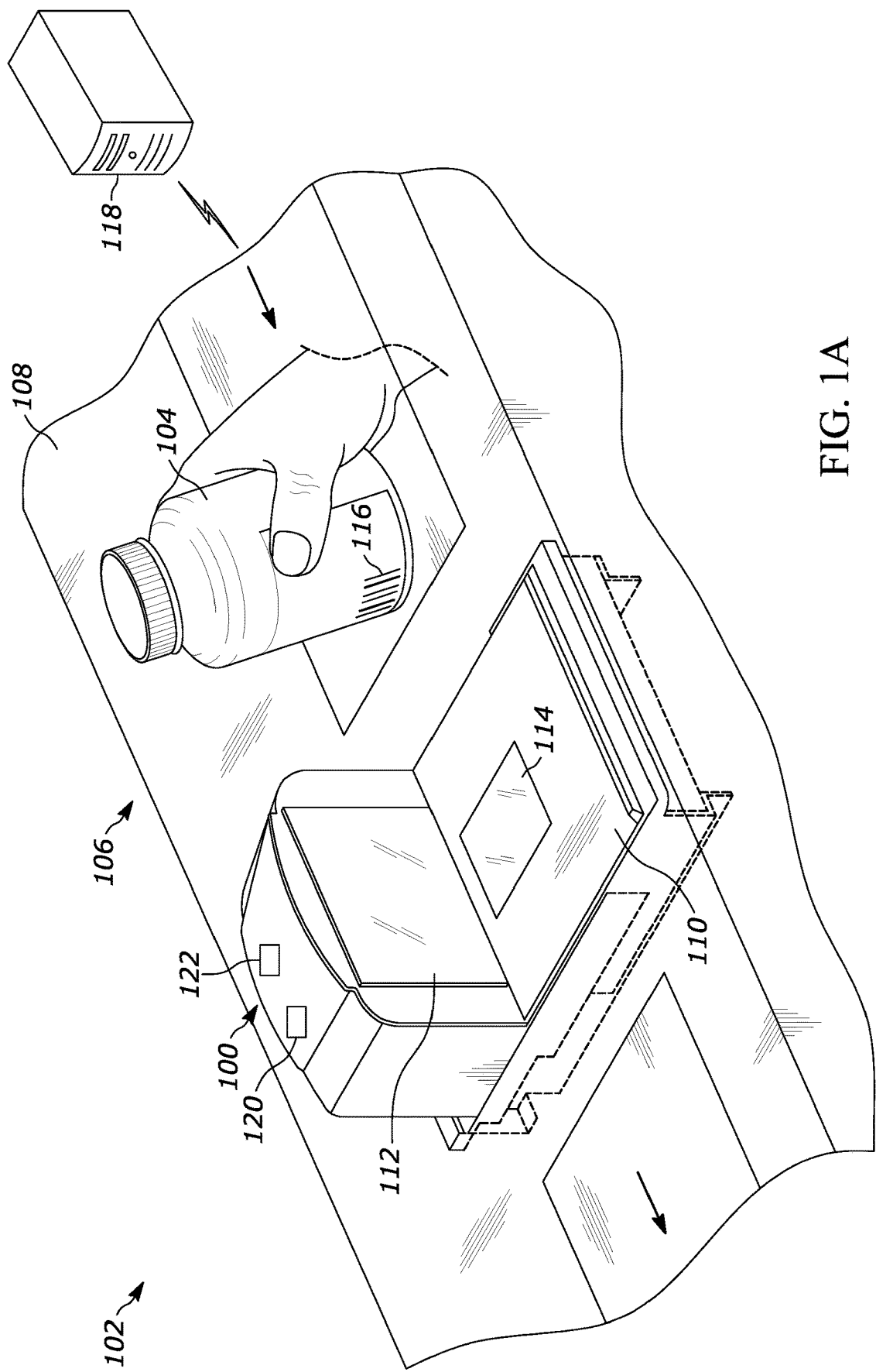
FIG. 1A is a perspective view of an example indicia reader that may be used to implement inventive concepts described here.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, higher resolution images and associated image data produced by an imaging system may strain or otherwise negatively impact the operation of the system when the images/data have a higher resolution than required for an intended purpose. Thus, conventional imaging systems, such as indicia reading systems, may suffer from slow performance, limited availability of, and/or excessive use of, data bandwidth, network resources, processing resources, data communication, etc. Additionally, lower resolution images may not be adequate for the intended purposes due to the reduced resolution, or other associated aspects of the lower resolution images.

Therefore, it is an objective of the present disclosure to provide systems and methods for operating an imaging system, indicia reader, or other similar system according to the disclosure herein which are capable of generating various kinds of images (e.g., higher resolution, lower resolution, cropped) suitable for one or more intended purposes (e.g., indicia decoding, object detection, object recognition, facial recognition, loss prevention, etc.), and also minimize the image data which is processed by the system. As a result, imaging systems, barcode scanners, bioptic indicia readers, POS systems, and the like may operate more efficiently by reducing the amount of data processed, reducing the system resources required for processing the data, functioning properly in low/limited bandwidth environments, improving system accuracy, any or all of which may result in customers saving time and effort to experience a more efficient and enjoyable checkout process.

Additionally, while the indicia and indicia scanning/decoding methods are referenced herein primarily as a barcode and barcode scanning/decoding respectively, it should be understood that the systems and methods of the present disclosure may apply to any indicia (e.g., barcodes, quick response (QR) codes, a graphic, a logo, etc.) associated with an object.

Moreover, and as will be understood by a skilled artisan, the techniques of the systems and methods disclosed herein may apply to indicia scanning/decoding as well as other implementations which may not necessarily include indicia scanning/decoding, such as object recognition, facial recognition, loss prevention, as well as others readily apparent to those of ordinary skill in the art having the benefit of the description herein.

In particular, the techniques of the present disclosure provide solutions to the issues experienced with conventional imaging systems, indicia readers, barcode scanning devices and the like. As an example, the techniques of the present disclosure alleviate these issues by introducing a system for operating an indicia reader that includes a first imaging assembly (also referred to as a first imager, imaging device, and similar) configured to capture one or more images in a field of view, store the associated image data in memory, generate one or more lower resolution images having corresponding lower resolution image data, determine a region of interest in the lower resolution images based upon analysis and detection of an object of interest in the lower resolution images, generate cropped images of the region of interest from corresponding higher resolution images, and transmit a message to a host based upon an analysis of the cropped images which determines information corresponding to the object of interest.

These components enable the system to enhance the performance of high resolution imaging/vision systems in low bandwidth environments, among other things. In this manner, the techniques of the present disclosure enable efficient, rapid, accurate indicia decoding, object identification, as well as other operations, without requiring the exclusive use of full scale, high resolution images produced by the high resolution imaging assembly during such operations.

Accordingly, the present disclosure includes improvements in computer functionality relating to operating an imaging system such as an indicia reader by describing techniques for generating, analyzing, and performing operations associated with, among other things, lower resolution images/image data, and/or higher resolution cropped images/image data. That is, the present disclosure describes improvements in the functioning of an imaging/scanning system and the present disclosure improves the state of the art at least because previous scanning and/or imaging systems typically lacked enhancements described in the present disclosure, including without limitation, enhancements relating to transforming higher resolution images/image data as described throughout the present disclosure.

In addition, the present disclosure includes applying various features and functionality, as described herein, with, or by use of, a particular machine, e.g., a first imaging assembly and/or a second imaging assembly and/or other components as described herein.

Moreover, the present disclosure includes specific features other than what is well-understood, routine, conventional activity in the field, or adding unconventional steps that demonstrate, in various embodiments, particular useful applications, e.g., capturing by a first imaging assembly, one or more images comprising image data of a field of view of the first imaging assembly; storing the image data in a memory associated with the indicia reader; generating one or more lower resolution images comprising lower resolution image data corresponding to the one or more images comprising image data; analyzing the lower resolution image data to detect an object of interest; determining a region of interest in the one or more lower resolution images of the lower resolution image data corresponding to the object of interest based upon detecting the object of interest and having the object of interest meet a predetermined condition; accessing the image data of the one or more images from the memory based upon determining the region of interest; generating cropped image data by cropping the one or more images to include the region of interest; analyzing the cropped image data to determine information corresponding to the object of interest; and transmitting a message to a host, the message being based at least in part on the information corresponding to the object of interest.

FIG. 1A is a perspective view of a prior art bioptic indicia reader 100, implemented in a prior art point-of-sale (POS) system 102, showing capture of an image of a target object 104 being swiped across the indicia reader 100 scanning area. The POS system 102 includes a workstation 106 with a counter 108, and the indicia reader 100. The indicia reader 100 includes a weighing platter 110, which may be removable or non-removable. Typically, a customer or store clerk will pass the target object 104 from in a general direction, in the illustrated example right-to-left, across at least one of a substantially vertical imaging window 112 or a substantially horizontal imaging window 114 to enable the indicia reader 100 to capture one or more images of the target object 104, including the barcode 116.

As part of the customer or clerk passing the target object 104 across the imaging windows 112, 114, the indicia reader 100 may trigger an illumination source 120 included in the indicia reader 100 to emit illumination, and for an imaging sensor 122 to capture image data of the target object 104 and/or the barcode 116. The indicia reader 100 is operable to capture image data of sufficient quality to perform imaging-based operations like decoding a barcode 116 that appears in the captured image data. It should be appreciated that while items may be swiped past the indicia reader 100 in either direction, items may also be presented into the product scanning area by means other than swiping past the window(s). When the target object 104 comes into the any of the fields of view of the indicia reader 100, the barcode 116 on the target object 104 is captured and decoded by the indicia reader 100, and corresponding data (e.g., the payload of the indicia) is transmitted to a communicatively coupled host 118 (commonly comprised of a point-of-sale (POS) terminal).

Figure 1B:
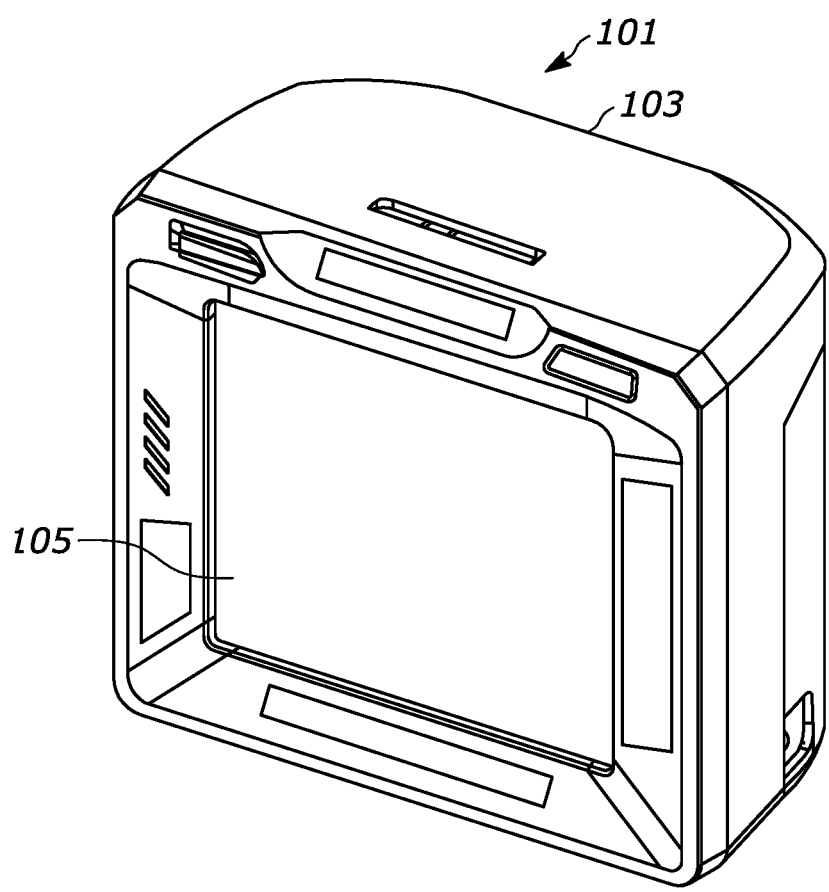
FIG. 1B is a perspective view of another example barcode reader that may be used to implement inventive concepts described here.

FIG. 1B illustrates another example of an indicia reader 101, sometimes referred to as a slot scanner. In the example shown, indicia reader 101 has a housing 103 and a window 105, which faces a product scanning area, to allow a set of optical components positioned within housing 103 to direct at least one field-of-view through window 105. Indicia reader 101 operates on a similar principle as the indicia reader 100 of FIG. 1A. However, it is generally smaller (typically having a window that is smaller than 5 inches across), includes a single window, and, while it could be installed in a slot of a counter (functioning like the bottom portion of the bioptic indicia reader 100), it can also be used as a stationary scanner positioned on a working surface (functioning like the upper portion of the bioptic indicia reader 100).

Figure 1C:
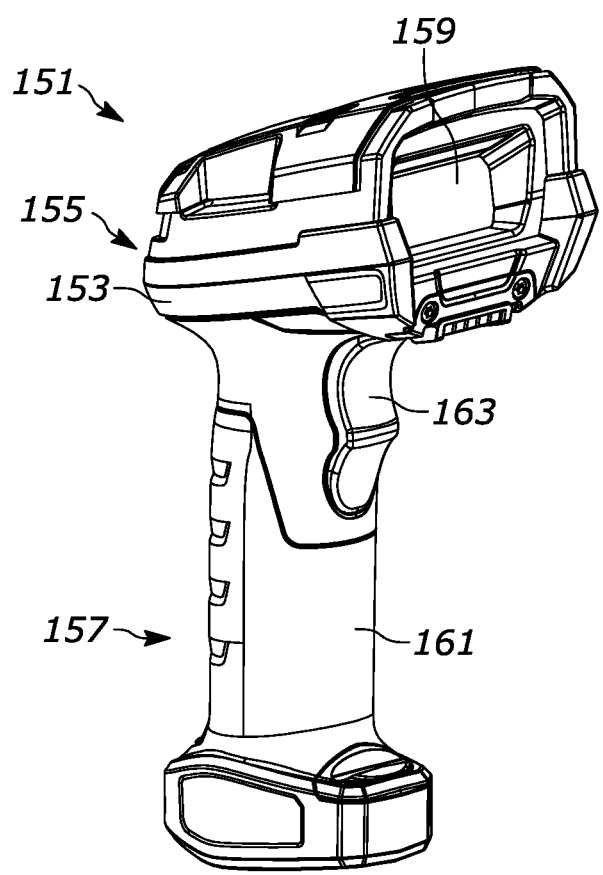
FIG. 1C is a perspective view of another example barcode reader that may be used to implement inventive concepts described here.

FIG. 1C illustrates yet another example of an indicia reader 151, sometimes referred to as a handheld indicia reader. Reader 151 generally includes a housing 153 that is comprised of a head portion 155 and a bottom portion 157. The head portion 155 houses at least some optoelectrical components for capturing relevant image data along a field of view (FOV) that extends through a window 159. The bottom portion 157 typically includes a handle portion 161 and a trigger 163. In operation, a user typically grasps the handle portion 161 and points the reader 151 in a general direction of the indicia that is to be read. If the reader is configured to be activated with the activation of the trigger 163, subsequent to the user squeezing the trigger 163, reader 151 captures relevant image data and processes it accordingly.

While it will be appreciated that concepts described herein may be used in connection with any of the indicia reader embodiments described above, this should not be considered limiting and it should be understood that other form factors of indicia readers could be employed.

Figure 1D:
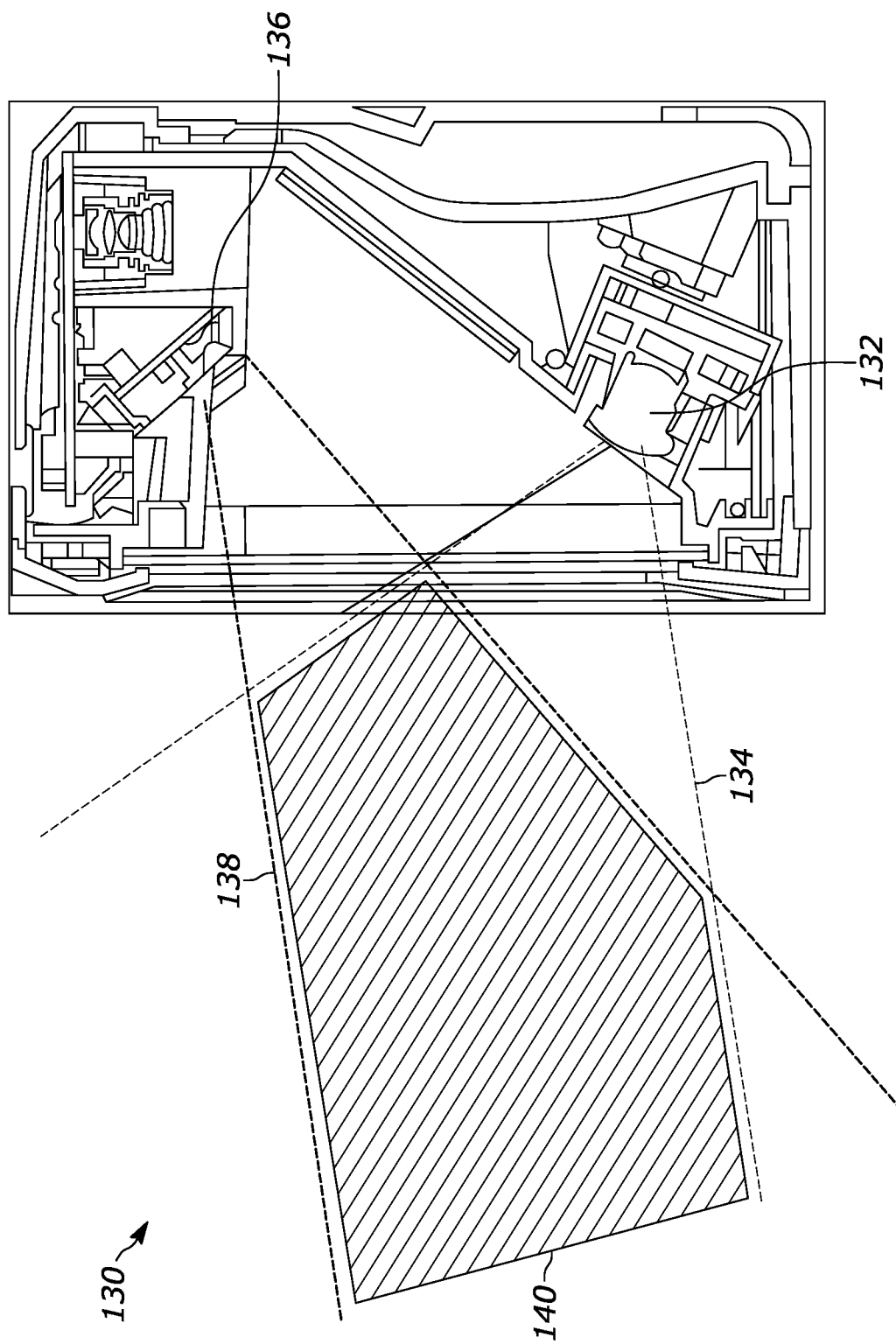
FIG. 1D illustrates a profile view of an example scanning system that includes a first imaging assembly and a second imaging assembly, in accordance with embodiments disclosed herein.

FIG. 1D depicts a profile view of an embodiment of an imaging system, in accordance with embodiments described herein. It should be appreciated that the embodiment of the imaging system described herein is for the purposes of discussion only. The imaging system may describe only a portion of the imaging system (e.g., implemented in a particular retail location), and the entire imaging system may include some/all of the imaging system components and the like described herein. For example, the second imaging assembly 132 of the imaging system may be depicted as within the same housing as the first imaging assembly 136, however, in other embodiments the first and second imaging assemblies 132, 136 may be separately located and operably connected.

Generally speaking, the imaging system may be implemented via a bioptic indicia reader 130, although other scanning systems may be within the scope of the invention. As depicted in FIG. 1D, the bioptic indicia reader 130 may include a first imaging assembly 136 configured to capture one or more images comprising image data. In some embodiments, the first imaging assembly 136 may be implemented with one or more vision cameras. In certain embodiments, the first imaging assembly 136 (e.g., vison camera) may be oriented to have a first FOV 138 of the scanning area.

The bioptic indicia reader 130 may include a second imaging assembly 132 (e.g., barcode reader) configured to capture images comprising image data. The second imaging assembly 132 may include a scanner that is configured to detect and decode barcodes and/or other object indicia (e.g., barcode reader). In some embodiments, the second imaging assembly 132 may be implemented with a dedicated indicia scanner, such as a indicia reader 100 of FIG. 1A, to detect and/or decode barcodes of items scanned for purchase.

The second imaging assembly 132 may be oriented to have a second FOV 134 of objects passing across the scanning area, which may create an overlap region 140 with at least a portion of the first FOV 138 of the first imaging assembly 136. In other embodiments, the first imaging assembly 136 may be located separately from the second imaging assembly 132 (e.g., the second imaging assembly 132 is contained in a separate imaging assembly from the first imaging assembly 136), while still having a first FOV 138 of objects passing over the scanning area. Additionally, the barcode of the object being scanned does not need to be within the first FOV 138 of the first imaging assembly 136, as the first imaging assembly 136 may not be configured and/or required to detect a barcode to identify an object. As a result, the first imaging assembly 136 may be positioned in the bioptic indicia reader 130 with greater flexibility than the second imaging assembly 132.

In some embodiments, the multiple imaging assemblies may be a single imaging assembly with a single imaging sensor (e.g., a single imaging sensor configured for barcode scanning and visual imaging). The single imaging assembly may have a single FOV of objects passing over the scanning area and may be configured for indicia decoding and visual imaging (e.g., machine vision analysis) of the images captured by the single imaging assembly.

In some embodiments, each and/or both of the imaging assemblies 132, 136 may include multiple image sensors which process images in the same/similar manner, and/or may operate collectively, e.g., to produce an image. In such an example, each of the multiple image sensors may have a slightly different FOV, such that the FOV 134, 138 described above may be and/or include the multiple FOVs of the multiple image sensors. For example, first imaging assembly 136 may have four images sensors, each with a slightly different FOV, and are configured to collectively capture an image in the FOV 138.

In at least some embodiments, either and/or both imaging assemblies 132, 136 may store image data corresponding to captured images in a memory, such as a memory local to the bioptic indicia reader 130, a remote memory such as a database on a host (POS) and/or server communicatively coupled to the imaging assemblies 132, 136, or in any other suitable memory.

In some embodiments, the bioptic indicia reader 130 imaging assemblies 132, 136 may capture image data in their respective FOVs 134, 138, such that the imaging system may capture image data using both/either imaging assemblies 132, 136 for indicia decoding, machine vision analysis, and/or other suitable purpose when a user passes an object through the overlap region 140, or any other suitable object appears in the overlap region 140 (e.g., the face of a person, etc.). For example, in some embodiments the second imaging assembly 132 may capture one or more initial images comprising initial image data of an object in the FOV 134, analyze the initial image data to decode an indicia associated with the object in the initial image data, resulting in a decoded indicia value. Based upon the decoded indicia value (e.g., which may indicate a ticket switch as described below), the second imaging assembly 132 and/or other component of the bioptic indicia reader 130 may determine a region of interest, such as a region of interest proximate the indicia. The region of interest may then be associated with one or more images captured by the first imaging assembly 136 having a FOV 138 which overlaps 140 with the FOV 134 of the second imaging assembly 132. For example, the region of interest proximate the indicia of the object may be used by the bioptic indicia reader 130 to identify the object attached to the indicia in the images captured by the first imaging assembly 136. Identification of the object may determine whether a ticket switch occurred, i.e., rather than purchasing the object by scanning its associated barcode, a user scans the barcode of a less-expensive object in its place, in effect fraudulently purchasing the object for the cost of a less expensive item associated with the scanned barcode. While determining a region of interest from initial image data based upon decoding the indicia is provided as one example, one having skill in the art will understand the second imaging assembly 132 and/or other component of the bioptic indicia reader 130 may determine a region of interest in the initial image data in other ways, e.g., when detecting a barcode (without decoding it) and determining the region of interest around the barcode, which in some aspects may be based upon detecting and/or identifying features which may be associated with barcode (e.g., a pattern resembling a barcode). In another example, detecting but not identifying an object of interest in the initial image data. For instance, the bioptic indicia reader 130 may be configured to "wake up" (e.g., initialize the first and/or second imaging assemblies 136, 132) based upon detecting the presence of an object in a FOV 134, 138, 140. The FOV may include one or more zones, such that an object detected by the second imaging assembly 132 may be detected in one or more zones which may be associated with one or more corresponding regions of interest. No matter how it is determined, the region of interest in the initial image data may then be correlated with a region of interest in the image data captured by the first imaging assembly 136, e.g., based upon the overlapping FOV 140, and/or in data of any other images (e.g., cropped images) and/or in any other suitable means.

In some embodiments, the first imaging assembly 136, the second imaging assembly 132, and/or any other suitable processing device and/or component of, or communicatively coupled to, the bioptic indicia reader 130 may include and/or execute an application, module (e.g., object identification module), algorithm, model (e.g., machine learning model), and the like to detect, track, identify and/or compare objects which have passed though the scanning area 132, 134, 140, decode an indicia, and/or any other suitable function. In these embodiments, the vision camera and the barcode scanner may collectively monitor for objects passing through the scanning area.

The bioptic indicia reader 130 and/or other suitable processor(s) may analyze image data to decode an indicia captured within image data. In an example, an image processing application of the bioptic indicia reader 130 may decode the barcode when the processor loads an indicia decoder from memory to process the first image data. The indicia may comprise an encoded indicia value as, for example, is the case with a 1D or 2D barcode where the barcode encodes an indicia value comprised of, for example, alphanumeric or special characters that may be formed into a string. Decoding the indicia associated with the object in the image data may result in a decoded indicia value. In one aspect, analyzing the image data and/or decoding an indicia may include extracting, via the indicia decoder (also referred to as an indicia decoding module), an image processing unit, or other suitable component, an indicia payload associated with an indicia present in image data. For example, decoding the indicia may include optical character recognition of letters and/or numbers of the indicia, or any other suitable manner of extracting a payload from an indicia. In at least some aspects, the indicia payload may indicate a class of items (e.g., cereal, dairy, produce, or any other suitable class of items). The class of items indicated by the indicia payload (e.g., a decoded indicia value) may be associated with items which are frequently used in a ticket switch, frequently stolen, have requirements for purchase (e.g., an age restriction), or other suitable classification.

The bioptic indicia reader 130 may transmit a decoded indicia value to a host, such as host 118, which may include a POS system. For example, the decoded indicia value may be used by the POS system to tally items a user is scanning with the bioptic indicia reader 130 for purchase during a scan session, to identify that a scanned item belongs to a class of items, such as ticket switching items, etc.

In some embodiments, the bioptic indicia reader 130 and/or other suitable processor(s) may analyze image data to detect and/or identify one or more objects in an image, such as images captured by the first imaging assembly (which may be full resolution, non-cropped images), lower resolution images, cropped images, or any other suitable images. Detecting an object within the image data may include identifying one or more of the location, position, boundary, edge(s), outline, feature(s) and/or other suitable features, characteristics, qualities, etc., of an object in image data. For example, detecting an object may include identifying that an object, such as an object of interest, is either present (in whole or in part) or not present within an image and/or image data. In some aspects, detecting an object within image data may not include identifying what the object is, but rather at least only whether an object is present within the image data. In at least some aspects, detecting an object may be associated with a score, confidence level, threshold, and the like, such that "successfully" detecting an object may not indicate with absolute certainty that an object was indeed detected, but rather, detecting an object may indicate it is more likely than not that an object has been detected, and/or indicate that some other metric and/or threshold has been met. Conversely, "unsuccessfully" detecting an object may indicate it is more likely than not that an object has not been detected, rather than an absolute certainty that an object was not detected. Said another way, whether or not an object is successfully or unsuccessfully detected may be relative and/or associated with an indication of whether a score, threshold, confidence level and/or other suitable metric has been met, not met, surpassed, and the like. For example, an object detection associated with a 60% confidence level or more may be considered a "successful" object identification, and a confidence level lower than 60% may be considered an "unsuccessful" identification of the object. Additionally, in at least some implementations, the bioptic indicia reader 130 and/or other suitable processor(s) may detect an object (e.g., in lower resolution image data) but may nonetheless generate, retrieve and/or obtain additional images/image data (e.g., retrieve image data from memory, generate cropped image data, etc.) to analyze a higher resolution image, e.g., to generate a higher confidence level associated with the object's detection. Thus, in at least some aspects, an object may be successfully detected yet still result the bioptic indicia reader 130 and/or other suitable processor(s) generating, retrieving and/or obtaining additional images/image data, such as higher resolution images/image data.

Similarly, identifying an object may be associated with a score, confidence level, threshold, and the like, such that "successfully" identifying an object may not indicate with absolute certainty that an object was identified, but rather, identifying an object may indicate it is more likely than not that an object has been identified, and/or indicate that some other metric and/or threshold has been met. Conversely, "unsuccessfully" identifying an object may indicate it is more likely than not that an object has not been identified, rather than an absolute certainty that an object was not identified. Again, whether or not an object is successfully or unsuccessfully identified may be relative and/or associated with an indication of whether a score, threshold, confidence level and/or other suitable metric has been met, not met, surpassed, and the like. Additionally, in at least some implementations, the bioptic indicia reader 130 and/or other suitable processor(s) may identify an object (e.g., in lower resolution image data) but may nonetheless generate, retrieve and/or obtain additional images/image data (e.g., retrieve image data from memory, generate cropped image data, etc.) to analyze a higher resolution image, e.g., to generate a higher confidence level associated with the object's identification. Thus, in at least some aspects, an object may be successfully identified yet still result the bioptic indicia reader 130 and/or other suitable processor(s) generating, retrieving and/or obtaining additional images/image data, such as higher resolution images/image data.

In an example, detecting and/or identifying an object within image data may include applying/executing a machine vision algorithm on the image data. This may include executing the machine vision algorithm locally on the bioptic indicia reader 130, or in other cases non-locally on a device and/or component communicatively coupled to the bioptic indicia reader 130, such as a host (POS), server, remote image processing unit, or other suitable component. More specifically, in this example, the machine vision algorithm may include one or more of edge detection, pattern matching, segmentation, color analysis, optical character recognition, blob detection, or other suitable means of conducting machine vision, any and/or all of which may be included as part of an object identification module and/or other suitable component.

In some embodiments, the bioptic reader 130 and/or other communicatively coupled device and/or component may include one or more applications, modules (e.g., object identification module), algorithms, models (e.g., machine learning model) and the like, to process, transform and/or generate images and/or image data. For example, an image processing unit of the bioptic indicia reader 130 as further described herein may generate a lower resolution image/image data based upon a higher resolution image/image data captured by the first imaging assembly 136, e.g., as the lower resolution image data may more easily be stored, transmitted and/or processed by the bioptic indicia reader 130 due to a reduced size as compared to the higher resolution image data. In one aspect, generating the lower resolution image is accomplished by binning pixels of a corresponding higher resolution image, i.e., combining multiple pixels and/or pixels values, such as adjacent pixels, into a lesser number of pixels/pixel values, which results in a lower resolution as compared to the original image.

In some embodiments, the bioptic reader 130 and/or other communicatively coupled device and/or component may also be able to transform an image, such as a higher and/or lower resolution image, into a cropped image by cropping the image. In at least some aspects, the image may be cropped according to cropping parameters. The cropping parameters may indicate one or more preferences, settings, specifications, conditions, requirements, considerations, and the like associated with generating one or more cropped images/image data. For example, the cropping parameters may indicate the cropped image/image data should be a certain size, should not exceed a maximum size, should have a certain aspect ratio, should be of a certain shape (e.g., if the region of interest is associated with a human face, the cropped image may be oval-shaped according to the general shape of the human face), and/or other suitable parameter. The image cropping may be carried out using artificial intelligence, machine learning, and/or the like, and/or may be based upon contrast, color, edge detection, and/or in any other suitable manner.

More generally, the components of the bioptic indicia reader 130 may be or include various additional components/devices. For example, the imaging assemblies 132, 136 may include a housing positioned to direct the fields of view of the various imaging assemblies 132, 136 in particular directions to capture image data. In some examples, the first imaging assembly 136 is contained in a separate assembly (e.g., a vision assembly), imaging assembly and/or housing from the second imaging assembly 132. In some examples, the first imaging assembly 136 is contained in the same assembly, imaging assembly and/or housing as the second imaging assembly 132. Additionally, while the bioptic indicia reader 130 of FIG. 1D may be described as pertaining to a retail environment, more generally the bioptic indicia reader 130 may be deployed in any of a variety of environments including a warehouse facility, a distribution center, etc.

Figure 2A:
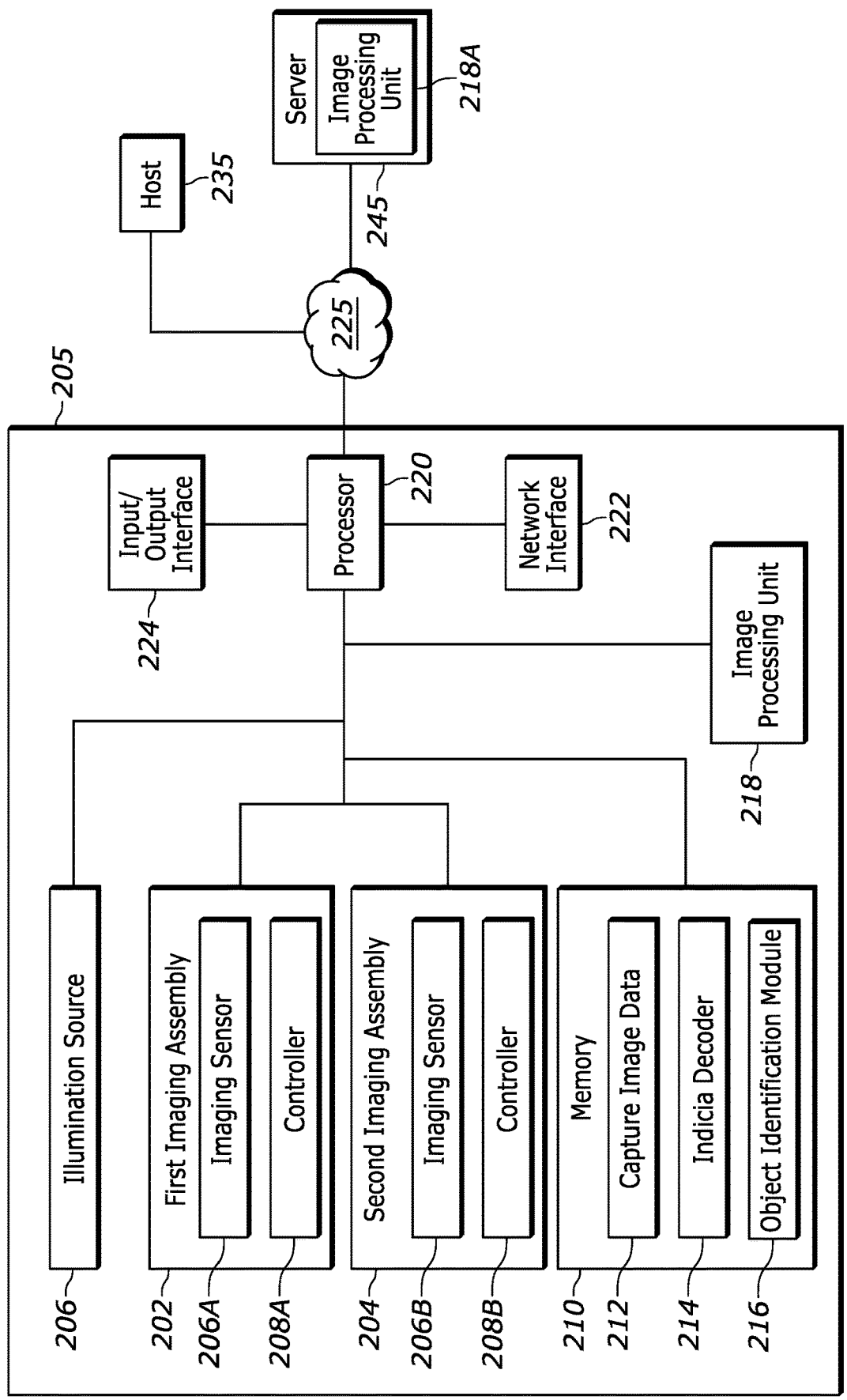
FIG. 2A is a block diagram of an example logic circuit for implementing example methods and/or operations described herein.

FIG. 2A is a block diagram representative of an example computing environment 200 capable of implementing, for example, one or more components of the example bioptic indicia reader 130 of FIG. 1D. The example computing environment 200 of FIG. 2A includes a processing platform 205, a network 225, a host 235 and a server 245.

The processing platform 205 may be capable of executing instructions to, for example, implement operations of the example methods described herein, as may be represented by the flowcharts of the drawings that accompany this description. As illustrated in the block diagram of FIG. 2A, the processing platform 205 may include imaging assemblies 202, 204, an illumination source 206, a memory 210, an image processing unit (IPU) 218, a processor 220, a network interface 222, and an I/O interface 224, any and/or all of which may be interconnected via an address/data bus.

Each of the imaging assemblies 202, 204 may include one or more imaging sensor(s) 206A, 206B. In particular, each of the first imaging assembly 202 and/or the second imaging assembly 204 may include one or more image sensors configured to capture image data corresponding to a target object, an indicia associated with the target object, and/or any other suitable image data. The imaging assemblies 202, 204 may be any suitable type of imaging assembly, such as an indicia scanner, a slot scanner, a vision camera, an original equipment manufacturer (OEM) scanner inside of a kiosk, a handle/handheld scanner, and/or any other suitable type of imaging assembly.

As an example, the first imaging assembly 202 may be or include a vision camera with one or more visual imaging sensors, such as imaging sensor 206A, configured to capture image data representative of an environment appearing within a FOV of the first imaging assembly 202, e.g., one or more images of the target object. The second imaging assembly 204 may be or include a barcode scanner with one or more barcode imaging sensors, such as imaging sensor 206B, configured to capture image data representative of an environment appearing within a FOV of the second imaging assembly 204, e.g., one or more images of an indicia associated with a target object.

The first imaging assembly 202 and/or the second imaging assembly 204 may each include one or more subcomponents, such as one or more controllers 208A, 208B to control and/or perform operations of the first imaging assembly 202 and second imaging assembly 204 respectively. The first imaging assembly 202 and/or the second imaging assembly 204 may further include one or more imaging shutters (not shown) that are configured to enable the imaging assemblies 202, 204 to capture image data corresponding to, for example, a target object and/or an indicia associated with the target object. It should be appreciated that the imaging shutters included as part of the imaging assemblies 202, 204 may be electronic and/or mechanical shutters configured to expose/shield the imaging sensors 206A, 206B of the imaging assemblies 202, 204 from the external environment. In particular, the imaging shutters that may be included as part of the imaging assemblies 202, 204 may function as electronic shutters that clear photosites of the imaging sensors 206A, 206B at a beginning of an exposure period of the respective sensors.

In operation, the imaging assemblies 202, 204 may capture image data as captured image data 212 which may comprise 1-dimensional (1D) and/or 2-dimensional (2D) images of a target object, including, for example, packages, products, faces, or other target objects that may or may not include indicia, barcode, QR codes, or other such labels for identifying such packages, products, or other target objects, which may be, in some examples, merchandise available at retail/wholesale store, facility, or the like. The processor 220, IPU 218, and/or other suitable component(s) of the example computing environment 200 may thereafter analyze the captured image data 212 of target objects and/or indicia passing through a field of view of the imaging assemblies 202, 204, e.g., for indicia decoding, object recognition/identification, or any other suitable purpose.

The processing platform 205 may also include an illumination source 206 that is generally configured to emit illumination during a (predetermined) period corresponding to capturing image data 212 via the imaging assemblies 202, 204. In some embodiments, the first imaging assembly 202 and/or the second imaging assembly 204 may use and/or include color sensors and the illumination source 206 may emit white light illumination. Additionally, or alternatively, the first imaging assembly 202 and/or the second imaging assembly 204 may use and/or include a monochrome sensor configured to capture captured image data 212 of an indicia associated with the target object in a particular wavelength or wavelength range (e.g., 600 nanometers (nm)-700 nm). The illumination source may correspondingly emit particular wavelengths (e.g., red wavelengths, IR) to suit the requirements of the imaging assemblies.

Captured image data 212 may be utilized by the processor 220, IPU 218, and/or other component(s) to make some/all of the determinations described herein. For example, the indicia decoder 214 and/or object identification module 216 may include executable instructions that cause the processor 220 to perform some/all of the analyses and determinations described herein. The analyses and determinations may include the captured image data 212, decoded indicia values, as well as any other data collected by or from the first imaging assembly 202 and/or the second imaging assembly 204.

Namely, the first imaging assembly 202 having a FOV of objects passing across the scanning area of the indicia reader, such as bioptic indicia reader 130, may capture one or more images comprising image data of an object. The image data may be stored in memory 210 as captured image data 212. The object identification module 216, IPU 218 and/or processor 220 may operate to detect and/or identify an object within the image data. For example, the object identification module 216 may detect whether the object is at least partially present in the image data, may identify the object in the image data, may determine a region of interest (e.g., based upon detecting an object, unsuccessfully identifying the object, and/or any other suitable conditions) of the image, etc.

A second imaging assembly 204 having a second FOV of objects passing across a scanning area of an indicia reader may capture a one or more images comprising image data, which may be stored in memory 210 as captured image data 212. The images may contain an indicia. The indicia decoder 214, IPU 218, and/or processor 220 may operate to decode the indicia, resulting in a decoded indicia value. The decoded indicia value may be stored in memory 210, transmitted the host 235, e.g., via the network interface 222 over network 225, etc. For example, the processing platform 205 may transmit the decoded indicia value to a POS system so that a customer is charged for purchasing the object associated with the indicia.

The processing platform 205 of FIG. 2A may include a memory 210 accessible by the processor 220 (e.g., via a memory controller) and/or other components of the processing platform 205 (e.g., the first imaging assembly 202 via controller 208A). The memory 210 may include one or more suitable storage media such as a magnetic storage device, a solid-state drive, random access memory, volatile memory, non-volatile memory, a database, and/or any other suitable memory. The memory 210 may be a local memory included within the housing of an indicia reader, such as bioptic indicia reader 130. The memory 210 may contain instructions which may be executed by the processor 220. The instructions may include software applications, algorithms, modules, decoders, machine learning models, and/or other suitable instructions.

The processor 220 may include one or more processors such as a microprocessor (UP), microcontroller, central processing units (CPU) and/or graphics processing unit (GPU) and/or any suitable type of processor. The processor 220 may include one or more logical processors (e.g., virtual execution unit(s) having one or more threads) and/or physical processors (e.g., hardware execution units having one or more cores) and may include multitasking and/or parallel processing.

Figure 3:
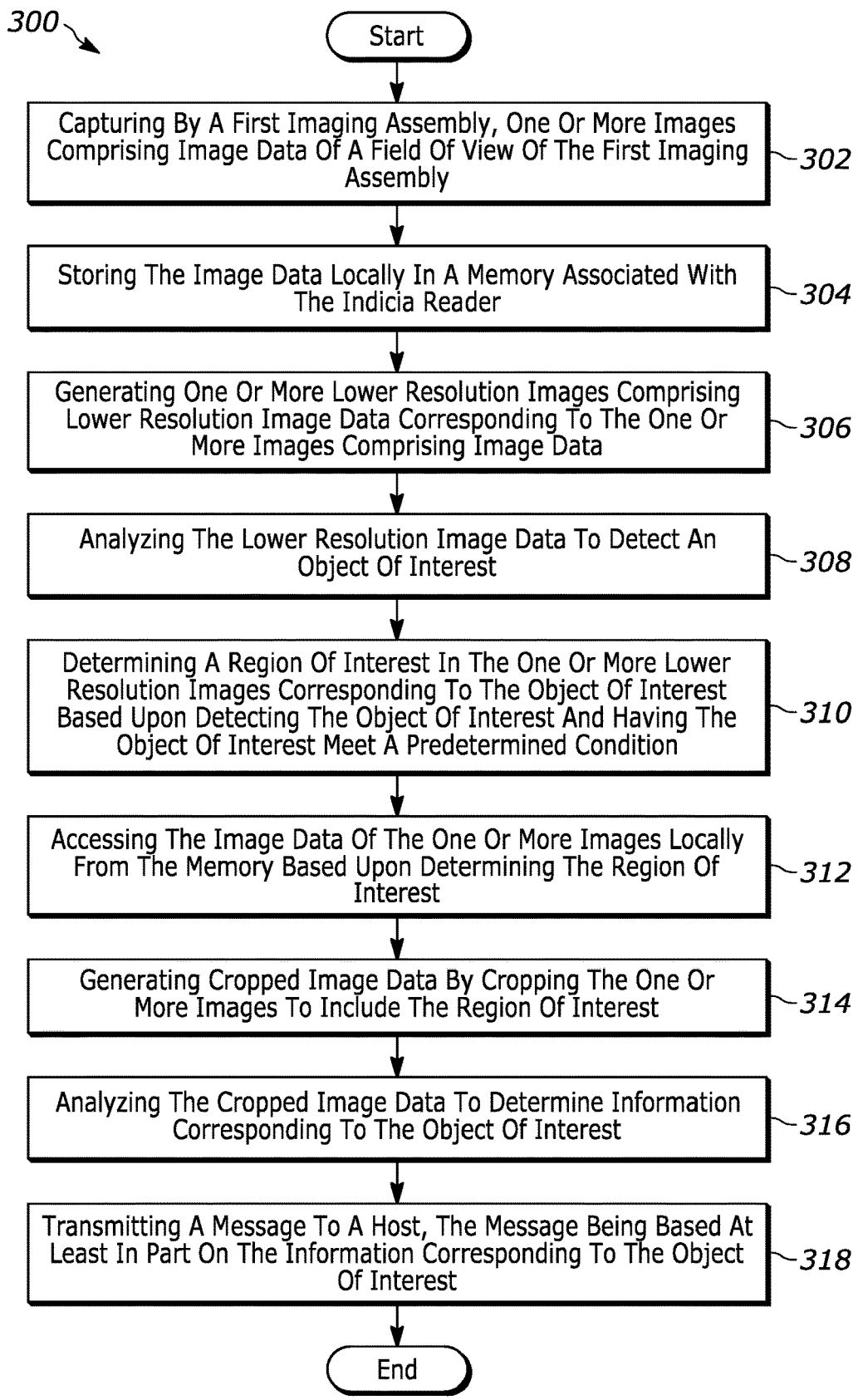
FIG. 3 illustrates an example method for operating an indicia reader, in accordance with embodiments disclosed herein.

The processor 220 may interact with the memory 210 to obtain, for example, machine-readable instructions stored in the memory 210 corresponding to, for example, the operations represented by the flowcharts of this disclosure, such as the flowchart of FIG. 3. The processor 220 may also interact with the memory 210 to obtain, or store, data and/or instructions related to the first imaging assembly 202, the second imaging assembly 204, the illumination source 206, the IPU 218, and/or other component(s) of the computing environment 200. In particular, the instructions stored in the memory 210, when executed by the processor 220, may cause the processor 220 to receive and analyze data and signals generated by the imaging assemblies 202, 204. For example, the memory 210 may include one or more programs, algorithms, models, modules, and the like which may analyze captured image data 212 from images captured by imaging assemblies 202, 204, e.g., the indicia decoder 214 and/or IPU 218 to decode indicia within the captured image data 212, the object identification module 216 and/or IPU 218 to detect and/or identify objects within the captured image data 212, etc. Additionally, or alternatively, machine-readable instructions corresponding to the example operations described herein may be stored on one or more removable media (e.g., a compact disc, a digital versatile disc, removable flash memory, etc.) that may be coupled to the processing platform 205 to provide access to the machine-readable instructions stored thereon.

Generally speaking, executing the indicia decoder 214 (e.g. via processor 220) may include analyzing images that include the indicia (e.g., as captured by the imaging assembly 204 which may be an indicia scanner) in order to decode the indicia, resulting in a decoded indicia value, which may be stored in memory 210. For instance, in some examples, decoded indicia values may be alphanumeric codes or values associated with each indicia, such as barcode 116. Moreover, in some examples, decoded indicia values may include indications of items to which the Indicia is affixed, e.g., items corresponding to the alphanumeric codes or values associated with each indicia.

Generally speaking, executing the object identification module 216 (e.g., via processor 220) may include detecting and/or identifying one or more objects and/or regions of interest in image data, such as captured image data 212, captured by a machine vision camera (e.g., first imaging assembly 202). In one embodiment, executing one or more algorithms and/or models locally on the indicia reader and/or processing platform 205 may include one or more of: (i) edge detection, (ii) pattern matching, (iii) segmentation, (iv) color analysis, (v) optical character recognition (OCR), or (vi) blob detection.

Given the limited capacity of the memory 210, processing platform 205 may subsequently delete items stored memory 210 at various intervals, such as at the completion of each scan session at the bioptic indicia reader 130 (which may be determined, e.g., by the bioptic indicia reader 130 measuring an idle period greater than a threshold idle period, identifying a new person in the images captured by an imaging assembly, such as machine vision camera of the second imaging assembly 204, etc.), at each reboot of the bioptic indicia reader 130, based on a storage limit of the memory 210 being exceeded, etc. For example, captured image data 212, decoded indicia values, or other suitable items in memory 210 may be deleted at one or more times which may improve the speed of the scan session and/or the processing platform 205.

The example processing platform 205 of FIG. 2A may also include an IPU 218. The IPU 218 may be and/or include one or more component(s) and/or subsystem(s) of the processing platform 205 which may be configured to process, analyze, manipulate, etc., image data such as captured image data 212. The IPU 218 may include one or more processors, controllers, memories, modules, or any other suitable component(s). The IPU 218 may perform operations such as image cropping, image scaling (e.g., upscaling or downscaling which may include increasing or decreasing the resolution of an image), object detection/recognition (e.g., detecting and/or recognizing the presence of at least part of one or more objects in an image), object identification (e.g., identifying one or more objects in an image), determining one or more regions of interest, and the like. To perform such operations, the IPU 218 may execute (e.g., via processor 220 or processor) one or more instructions, algorithms and/or models similar to the object identification module 216, and may have similar functionality as the object identification module 216 and/or other modules, programs, algorithms and/or components which process image data, such as indicia decoder 214.

The example processing platform 205 of FIG. 2A may also include a network interface 222 to enable communication with other machines via, for example, one or more networks 225. The example network interface 222 may include any suitable type of communication interface(s) (e.g., wired and/or wireless interfaces) and be configured to operate in accordance with any suitable protocol(s). For example, in some embodiments, networking interface 222 may transmit data or information (e.g., captured image data 212, decoded indicia values, etc.) between remote processor(s) and/or a remote server, such as host 235, server 245, and/or other components of the processing platform 205 or computing environment 200.

The example processing platform 205 of FIG. 2A may also include input/output (I/O) interfaces 224 to enable receipt of input (e.g., user input via a user interface) and/or communication of output data (e.g., to a user of the processing platform 205).

The example computing environment 200 of FIG. 2A may also include one or more communication and/or data networks 225 to communicatively couple components of the computing environment 200, such as the processing platform 205, host 235, server 245 and/or any other suitable device, via one or more communication interfaces, such as network interface 222. The network 225 may comprise any suitable network or networks, including a local area network (LAN), wide area network (WAN), Internet, or combination thereof. For example, the network 225 may include a wireless cellular service (e.g., 4G, 5G, etc.). Generally, the network 225 enables bidirectional communication between components of the computing environment 200. In one aspect, the network 225 may comprise a cellular base station, such as cell tower(s), communicating to the one or more components of the computing environment 200 via wired/wireless communications based on any one or more of various mobile phone standards, including NMT, GSM, CDMA, UMMTS, LTE, 5G, or the like. Additionally or alternatively, the network 225 may comprise one or more wired and/or wireless data buses, modems, routers, switches, or other such connection points communicating to the components of the computing environment 200, which may include wired and/or wireless communications based on any one or more of various standards, including by non-limiting example, IEEE standards (e.g., 802.3, 802.11b/g/n/ac/ax, etc.), Bluetooth, and/or the like.

The example computing environment 200 of FIG. 2A may also include a host 235, such as host 118 of FIG. 1A, which may be and/or include a POS.

The example computing environment 200 of FIG. 2A may also include a server 245. The server 245 may include one server or multiple servers, which may be arranged as a network of multiple servers, a bank of multiple servers, etc. The server 245 may implemented at least partially on an on-premise or local computing environment, a multi-cloud computing environment, a public cloud computing environment, a private cloud computing environment, and/or a hybrid cloud computing environment (e.g., Alibaba Cloud, Amazon Web Services (AWS), Google Cloud, IBM Cloud, Microsoft Azure, etc.). In an example arrangement, the server 245 may be implemented as, or on a part of, a cloud computing environment, or may otherwise communicate with other hardware or software components within one or more cloud computing environments to send, retrieve, or otherwise analyze data or information described herein. For example, in some arrangements, the processing platform 205 may be communicatively coupled via network 225 to the server 245. The server 245 may include an IPU 218A which may perform at least a portion of the techniques, methods, and/or functionalities discussed herein with respect to IPU 218, such as processing, analyzing, etc., the captured image data 212. This may be beneficial in embodiments where the processing platform 205 may operate with limited processing power, memory, bandwidth, and/or other resources, such that processing the captured image data 212 using the IPU 218A may provide benefits (e.g., speed, efficiency, etc.) respective to processing the captured image data 212 locally using the processing platform 205.

Although the computing environment 200 is shown to include one processing platform 205, one network 225, one host 235, and one server 245, it should be understood that the computing environment 200 may include additional, fewer, and/or alternate components, and may be configured to perform additional, fewer, or alternate actions, including components/actions described herein. Similarly, while the processing platform 205 is shown to include certain components, it should likewise be understood that the processing platform 205 may include additional, fewer, and/or alternate components, and may be configured to perform additional, fewer, or alternate actions, including components/actions described herein. For example, the computing environment 200 may include a plurality of processing platforms 205, all of which may be interconnected via the network 225. Similarly, the processing platform 205 may include multiple processors 220 and may not include an IPU 218 and otherwise carry out image processing (e.g., locally via object identification module 216 and/or indicia decoder 214, remotely via IPU 218A, etc.). Moreover, various aspects of the computing environment 200 may include any suitable additional component(s) not shown in FIG. 2A, and/or omit component(s) shown in FIG. 2A, such as but not limited to the exemplary components described above. Furthermore, it should be appreciated that additional and/or alternative connections between components shown in FIG. 2A may be implemented. As just one example, processing platform 205 and host 235 may be connected via a direct communication link (not shown in FIG. 2A) instead of, or in addition to, via network 225.

Figure 2B:
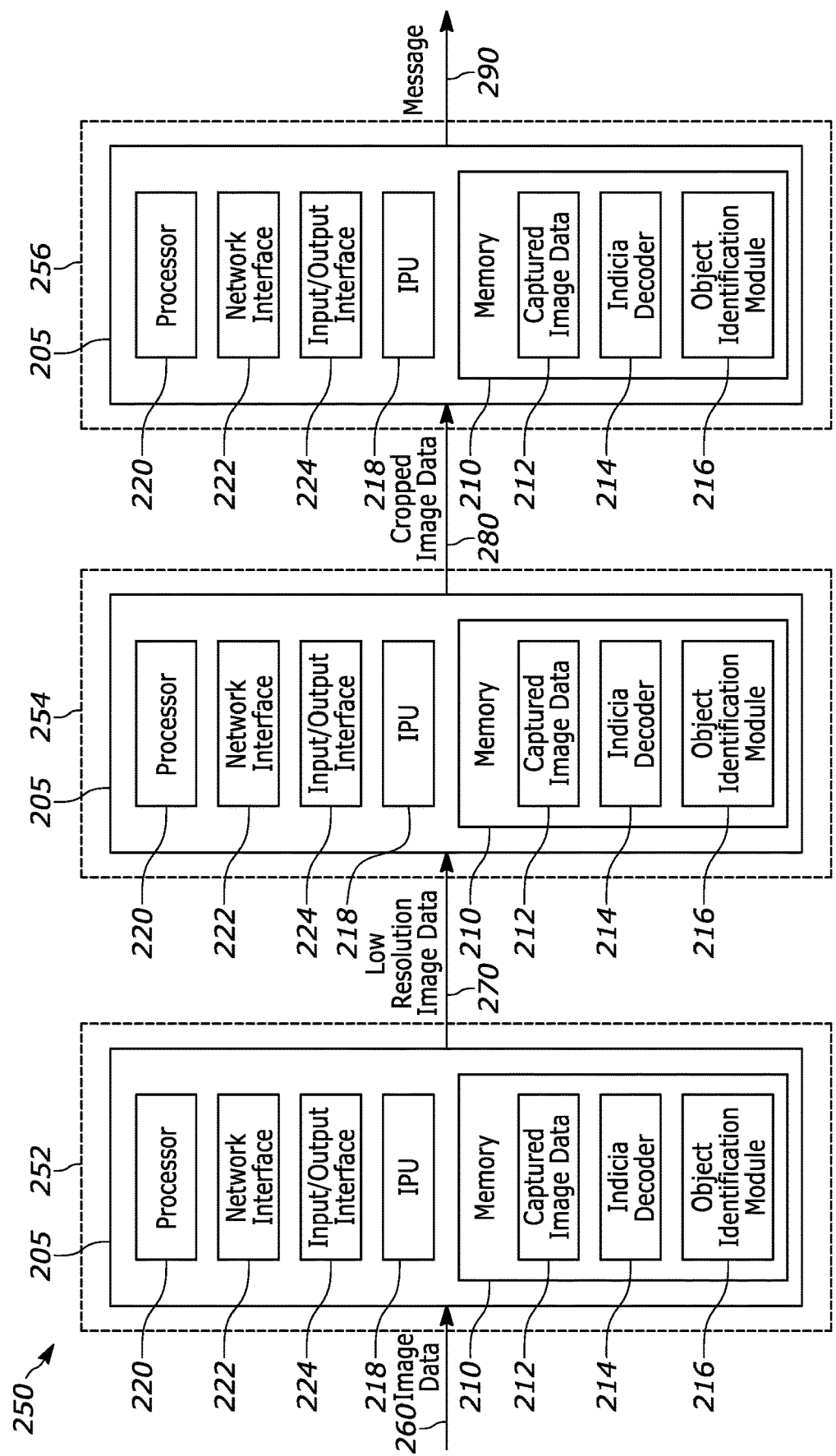
FIG. 2B is an example workflow block diagram for operating an indicia reader, in accordance with embodiments described herein.

Any/all of the aforementioned data may be used by a processor, such as processor 220, and/or other components to determine various outputs. For example, FIG. 2B is an example workflow block diagram 250 for operating an indicia reader, such as bioptic indicia reader 130, in accordance with embodiments described herein. The example workflow block diagram 250 generally illustrates various data received and/or retrieved by the processing platform 205, and is utilized by the computer-executable instructions stored in memory 210 (e.g., object identification module 216) as one or more inputs to generate one or more outputs. While the processor 220 is shown in FIG. 2B, any other suitable processor and/or component may be used for operating the indicia reader according to the systems and methods disclosed herein.

At a first time frame 252, the data received by the processing platform 205 includes image data 260 captured via the first imaging assembly 202, and the processing platform 205 may output lower resolution image data 270. The inputs/outputs of the processing platform 205 at the first time frame 252 may generally represent the processing platform 205 (i) capturing by the first imaging assembly 202, one or more images comprising image data 260 of the FOV of the first imaging assembly 202; (ii) storing the image data 260 as captured image data 212 in the memory 210 associated with the indicia reader; and (iii) generating one or more lower resolution images comprising lower resolution image data 270 corresponding to the one or more images comprising image data 260. In some aspects, the processor 220 may execute instructions to store image data 260 in memory 210, and processor 220 may execute instructions which cause the first imaging assembly 202 to capture the image data 260, store the captured image data 212 in local memory 210, and cause the object identification module 216 to generate the lower resolution image data 270.

In other aspects (not shown), the IPU 218 may generate the lower resolution image data 270 based upon the corresponding image data 260, as the IPU 218 may perform similar functions as the object identification module 216, as previously described.

In yet other aspects (not shown), the IPU 218A may generate the lower resolution image data 270. In such embodiments where there IPU 218A is used to process, analyze, generate, etc., data, the processing platform 205 may transmit the data to be processed by the IPU 218A to the IPU 218A (e.g., via network interface 222 over network 225), and subsequently the processing platform 205 may receive the data generated by the IPU 218A (e.g., via network interface 222 over network 225). In the example of first time frame 252, the processing platform 205 may transmit image data 260 to IPU 218A, and subsequently receiving lower resolution image data 270 in return.

At a second time frame 254, the processing platform 205 may analyze the lower resolution image data 270 as an input, and the processing platform 205 may output cropped image data 280. The inputs/outputs of the processing platform 205 at the second time frame 254 may generally represent the processing platform 205 (i) analyzing the lower resolution image data 270 (e.g., via object detection module 216, IPU 218, 218A, etc.) to detect an object of interest; (ii) determining a region of interest (e.g., via object detection module 216, IPU 218, 218A, etc.) in the one or more lower resolution images of the lower resolution image data 270 corresponding to the object of interest based upon detecting the object of interest and having the object of interest meet a predetermined condition (e.g., an unsuccessful identification of the object, or any other suitable condition); (iii) accessing the image data 270 (i.e., store as captured image data 212) of the one or more images from the memory 212 based upon determining the region of interest; and (iv) generating cropped image data 280 (e.g., via object detection module 216, IPU 218, 218A, a machine learning model stored in memory 210, or in any other suitable manner) by cropping the one or more images to include the region of interest.

At a third time frame 256, the processing platform 205 may analyze the cropped image data 280 as an input, and the processing platform 205 may output a message 209. The inputs/outputs of the processing platform 205 at the third time frame 256 may generally represent, analyzing the cropped image data 280 to determine information corresponding to the object of interest; and transmitting the message 290 to a host 235 (e.g., via network interface 222 over network 225), the message 290 being based at least in part on the information corresponding to the object of interest. The information corresponding to the object of interest, may be any suitable information. For example, if the object of interest is an indicia, the corresponding information may be a decoded indicia payload, a description of the object associated with the indicia, a price, size, quantity and/or weight of the object associated with the indicia, an indication of a successful decode of the indicia, etc. In another example, the object of interest is an item being scanned, and the corresponding information may be a description of the item, a price, size, quantity and/or weight of the item, whether the item is the same as the object associated with an indicia of the item, etc. In another example, the object of interest is a face, and the corresponding information may be a description of the face, an identity of the face, a gender of the person associated with the face, whether the face matches another face known to the processing platform 205, etc.

Of course, it should be understood that the inputs and/or outputs illustrated in FIG. 2B are for the purposes of discussion only and may not represent and/or include every input/output. It should also be understood that, in the description above, certain steps, actions, and the like may indicate identifying and/or determining an object and/or region of interest, however, this may include identifying and/or determining multiple objects and/or regions of interest, which is also contemplated by the techniques of the systems and methods described herein, as would be obvious to one skilled in the art. For example, identifying and/or determining an object of interest may include identifying and/or determining multiple objects of interest, e.g., identifying an object as grapes may include identifying more than one grape on a stem of a cluster of grapes, and the like.

In one example to illustrate workflow block diagram 250, a user of the processing platform 205 is purchasing a box of cereal. At the first time frame 252, the user may swipe the cereal box across the FOV of the first imaging assembly 202, thereby causing the first imaging assembly 202 to capture one or more images comprising image data 260 of the cereal box. The processing platform 205 may store the image data in memory 210 as captured image data 212, and generate one or more lower resolution images of the cereal box comprising lower resolution image data 270. The processing platform may generate the lower resolution images via processor 220 executing object detection module 216, IPU 218, 218A, one or more other modules, programs and/or applications stored in memory 210 and otherwise accessible to the processing platform 205, or in any other suitable manner. The lower resolution data may provide technical advantages for the processing platform 205 and/or computing environment 200, as previously described. For example, the first imaging assembly 202 may be a vision camera having an image sensor 206A which produces a large amount of image data for each image it captures. Generating corresponding lower resolution images/image data 270 may provide images which are still adequate for object detection/identification, indicia decoding, and/or other typical situations for which the captured images may be used. The lower resolution images/image data 270 may requiring less data, bandwidth, resources, etc., and provide increased speed and/or efficiency to transmit store and/or process the lower resolution image data 270 as compared to the image data 260. This may also result in a faster checkout experience for a user of the indicia reader and/or POS of the processing platform 205 and/or computing environment 200.

At the second time frame 254, the processing platform 205 may analyze the lower resolution image data 270 corresponding to the cereal box, e.g., via object detection module 216, IPU 218, 218A, to detect and/or identify an object of interest. In the present example, the object of interest is a barcode, such as barcode 116, on the cereal box the user wishes to purchase by swiping the cereal box across the first imaging assembly's FOV. However as demonstrated in the subsequent examples, and as will be obvious to one having skill in the art, the object of interest may be one or more things other than a barcode.

Continuing with the cereal box example, the object detection module 216 (or other suitable component such as IPU 218, etc.) may detect and/or identify the barcode in the lower resolution image data 270 using one or more algorithms, such as edge detection, pattern matching, segmentation, color analysis, blob detection, etc. For example, the presence of features resembling a barcode (e.g., a pattern of vertical bars closely spaced together) may result in determining the detection and/or identification of the barcode. In at least some implementations, when the barcode is detected and also identified (e.g., via object detection module 216, IPU 218, 218A) in the lower resolution image data 270, it may subsequently be decoded by the indicia decoder 214, (or other suitable component of the processing platform 205), indicating the user has successfully scanned the cereal box for purchase. In at least some aspects, detection and identification of the barcode may include decoding the barcode. However, the processing platform 205 may be unable to identify the barcode (e.g., via object detection module 216, IPU 218, 218A) in the lower resolution image data 270, for example the corresponding lower resolution image(s) may cause the barcode to be pixelated, have indistinguishable features, or be otherwise unidentifiable, such that the barcode cannot be decoded, e.g., via the indicia decoder 214. When the barcode is detected and meets one or more predetermined conditions (e.g., the condition being the barcode is not successfully identified, or any other suitable (predetermined) condition), the processing platform 205 (e.g., via object detection module 216, IPU 218, 218A, etc.) may subsequently determine a region of interest in the one or more lower resolution images of the lower resolution image data 270 corresponding to the barcode. The region on interest may be determined based upon the detection of the object/barcode in the lower resolution data 270. The processing platform 205 may subsequently access the image data 260 of the one or more images captured by the first imaging assembly 202 (e.g., images at full resolution stored as captured image data 212) from the memory 210 based upon determining the region of interest corresponding to the barcode. The processing platform 205 may generate (e.g., via processor 220, IPU 218, 218A or other suitable component) cropped image data 280 by cropping the one or more images to include the region of interest corresponding to the barcode. The cropped image data 280 may comprise a smaller amount of data as compared to the image data 260, yet still contain higher resolution around the region of interest/barcode, which may provide for a subsequent successful decoding of the barcode using the cropped image data 280. The cropped image data 280 may also provide the same or similar benefits and/or advantages (e.g., increased speed, less resources, etc.) to the processing platform 205 and/or computing environment 200 as those previously described.

At the third time frame 256, the processing platform 205 may analyze the cropped image data 280 to determine information corresponding to the barcode. For example, this may include analyzing the cropped image data 280 to successfully decode the barcode e.g., via indicia decoder 214, due to the cropped image(s) associated with the cropped image data 280 being of a better quality (e.g., higher resolution) as compared to the lower resolution image data 270. Upon successful decode of the barcode, the processing platform 205 may subsequently transmit a message 290 to a host such as host 235, the message 290 being based at least in part on the information corresponding to the barcode. For example, the message 290 may include a payload/decoded indicia value associate with the cereal box, such that once the message 290 is received by a POS, the cereal box is considered successfully scanned for purchase by the user.

In at least some embodiments, the processing platform 205 may receive an event signal which initiates or otherwise results in the sequence at first time frame 252. The event signal may be generated by, and/or received from, the host 235, processor 220 (e.g., based upon a user initiating a scanning session at the processing platform 205), from an administrator of the processing platform 205, from the server 245, and/or any other component(s). The event signal may indicate an event (e.g., loss prevention, ticket switching, a theft, facial recognition, etc.), a region of interest (e.g., proximate a detected object such as an indicia, etc.), an object of interest (e.g., a face, an item being scanned, etc.), and/or any other suitable information.

For example, the event signal may indicate a potential ticket switch of an item. In such an example, prior to the first time frame 252, a user may swipe an object across an overlapping FOV (e.g., FOV 140) of the first imaging assembly 202 and second imaging assembly 204. The second imaging assembly 204 may capture one or more initial images comprising initial image data of the object in its FOV. In this example, the second imaging assembly 204 is an indicia scanner such as second imaging assembly 132. Subsequently, the processing platform 205 may analyze the initial image data to decode an indicia in the initial image data (e.g., via indicia decoder 214, IPU, 218, 218A) associated with object, resulting in a decoded indicia value. The processing platform, (e.g., via memory 210 and processor 220, via a communicatively coupled component such as host 235, etc.) may determine the decoded indicia is for a pack of gum, which is a decoded indicia value associated with a class of objects (e.g., a pack of gum) frequently involved ticket switching. Based upon the determination, a message comprising the event signal indicating a potential ticket switch may be generated (e.g., via the second imaging assembly controller 208B, processor 220, the host 235, or other suitable component) and subsequently received by the processing platform 205. The message/event signal may result in the initiation of the sequence beginning at the first time frame 252.

Further, the processing platform 205 may determine (e.g., based upon the initial image(s)/image data) that the region of interest is proximate the indicia of the scanned object, which it has already recognized and decoded as being for a pack of gum. For example, in a ticket switching event, the region of interest may be proximate the indicia such that images which capture the region of interest/indicia may also capture the object associated with the indicia. If this is the case, and further the object scanned is able to be identified from the captured images, a ticket switch may be determined based upon the decoded indicia and object identification.

While in this example the event signal indicating the ticket switch is based upon the decoded indicia of the pack of gum, one having skill in the art will recognize that the event signal may be generated in other ways, for example by an observer of a possible ticket switch event who in-turn generates the signal, based upon an imaging device such as a vision camera or security camera detecting activity and/or an object which may indicate a ticket switch and subsequently generates the event signal, or in any other suitable manner.

In at least some embodiments, the first imaging assembly 202 may be continuously capturing one or more images comprising image data 260. The processing platform 205 may store the image data 260 in memory 210, such as in a buffer (not shown) of memory 210, or any other suitable memory. This may be beneficial in situations where having images of the FOV of the first imaging assembly may be useful before an event signal is received. For example, if a ticket switch is occurring previous to time sequence 252 when the user scans an object appearing to be a pack of gum based upon its decoded indicia, having images of the object during scanning which are captured by the first imaging assembly 202 may provide proof of whether a pack of gum is indeed being scanned, or rather some other object which simply has the barcode of the pack of gum. If the first imaging assembly only begins capturing images once the event signal indicating ticket switching is received, any images captured may likely be taken after the object having the gum barcode is scanned, which may prevent identification of a ticket switch.

Continuing with the pack of gum example, once the event signal indicating ticket switching is received, the sequence at time frame 252 may be initiated such that the processing platform 205 may store the images previously captured by the first imaging assembly 202 during scanning of the object having the gum indicia. The images may be stored as image data 260 in memory 210 (e.g., captured image data 212), if not done so already. The processing platform 205 may generate one or more lower resolution images/image data 270 comprising lower resolution image data 270 from the image data 260. The processing platform may generate the lower resolution images via processor 220 executing object detection module 216, IPU 218, 218A, one or more other modules, programs and/or applications stored in memory 210 and/or otherwise accessible to the processing platform 205, or in any other suitable manner.

At the second time frame 254, the processing platform 205 may analyze the lower resolution image data 270 to detect and/or identify the object of interest, which as described above, may already be indicated by the event signal as being associated with a pack of gum. The processing platform 205 may attempt to detect the object of interest/ possible pack of gum in the lower resolution image data 270 via object detection module 216, IPU 218, 218A, and/or any other suitable method. If the object of interest is detected and also identified, the workflow of block diagram 250 may end. If the object of interest is detected, and the object of interest meets a predetermined condition (e.g., that the object of interest cannot be identified, or other suitable condition), the processing platform 205 may determine a region of interest in the one or more lower resolution images/image data 270 (e.g., via object detection module 216, IPU 218, 218A).

In at least some implementations as described above, the processing platform 205 may already know and/or have determined the region of interest based upon the event signal generated as a result of scanning/decoding the barcode associated with the pack of gum at the second imaging assembly 204, or other suitable means. In such an example where the processing platform 205 has already identified the region of interest (e.g., proximate the barcode) based upon the initial images/image data the second imaging assembly 204, the processing platform 205 may determine a corresponding region of interest in other images/image data, such as image data 260 captured by the first imaging assembly during scanning of the potential pack of gum, in the lower resolution image data 270 subsequently generated during time sequence 252, etc. In at least some aspects where the ticket switch event signal indicates the region of interest based upon initial image data which the processing platform 205 correlates to a region of interest in image data 260, the processing platform 205 may attempt to identify the object (e.g., the pack of gum or other object ticket switched to appear as a pack of gum to the processing platform 205 when scanned) in the region of interest of the (higher resolution) image data 260. In such an aspect, if the object identification is successful from the image data 260, the workflow of block diagram 250 may end, as it may be possible to determine whether a ticket switch has occurred or not.

Once the region of interest is determined in the lower resolution image data 270 by the processing platform 205 during the second time frame 254, the processing platform may subsequently retrieve the corresponding image data 260 from the memory 210. The processing platform 205 may then generate (e.g., via processor 220, IPU 218, 218A or other suitable component) cropped image data 280 by cropping the one or more images of the image data 260 to include the region of interest (e.g., around the barcode of the potential pack of gum).

At the third time frame 256, the processing platform 205 may analyze the cropped image data 280 (e.g., via object detection module 216, IPU 218, 218A) to determine information corresponding to the object of interest/potential pack of gum. For example, this may include analyzing the cropped image data 280 which includes the area proximate the barcode/region of interest to determine whether the object of interest is actually a pack of gum (in which case no ticket switch occurred), or whether the object of interest proximate the barcode is another item, indicating a ticket switch may have occurred. Upon determining information corresponding to the object of interest/potential pack of gum, the processing platform 205 may then transmit a message 290 to a host (such as host 235), the message 290 being based at least in part on the information corresponding to the object of interest, e.g., the message 290 may include an indication of whether a ticket switch occurred, what the object of interest is, or any other suitable information. In the present example, message 290 may indicate whether the object is a pack of gum or something else.

In yet another example, the computing environment 200/ processing system 205 may be used for facial recognition, e.g., to identify a person suspected of theft or other purposes. As with the previous example, initiating the sequence beginning at time frame 252 may be a result of the processing platform 205 receiving an event signal which may indicate theft and/or facial recognition. In at least some embodiments, the first imaging assembly 202 may be continuously capturing images as previously described. In this example, a thief steals an item in the FOV of an indicia scanner as they walk through the checkout lane without conducting a self-checkout. By the time an event signal indicating the potential theft is generated and received by the indicia reader, the thief may already be out of the FOV of the first imaging assembly 202 of the indicia reader, such that images captured by the first imaging assembly 202 only after receiving the event signal may be of no use in identifying the thief and/or theft. By continuously capturing and storing images, the processing platform 205 may obtain images before receiving the event signal which are useful for identifying the thief/theft, or for any other suitable purpose.

In at least some embodiments, upon receiving the event signal indicating image recognition, the processing platform 205 has already been capturing image data 260 via the first imaging assembly 202 and storing the image data in memory 210. During time sequence 252 which may be initiated by the event signal, the processing platform 205 generates one or more lower resolution images comprising lower resolution image data 270 from the image data 260 captured proximate to receiving the event signal, i.e., images captured before, during and after receiving the event signal. The processing platform 205 may generate the lower resolution image data 270 via processor 220, object detection module 216, IPU 218, 218A, one or more other modules, programs and/or applications stored in memory 210 and otherwise accessible to the processing platform 205, or in any other suitable manner, as previously described.

At the second time frame 254, the processing platform 205 may analyze the lower resolution image data 270 to detect and/or identify an object of interest, which in this example is the face of a potential thief. In at least some embodiments, and similar to the gum example, the event signal indicating facial recognition may inform the processing system 205 that the object of interest is a face. Object detection module 216, IPU 218, 218A, or other suitable component may attempt to detect and/or identify the face in the lower resolution data 270. If detection and identification of the face occurs from the lower resolution image data 270, the workflow of block diagram 250 may end.

In the instant example, "successfully identifying" the face may include identifying the face in such a manner as to be able to identify the person in one or more images (e.g., the original images captured, lower resolution images, cropped images, etc.) based upon their face, although "successful identification" may have other connotations suitable for being considered a "successful identification" for facial recognition purposes, e.g., successfully capturing a certain number of features of the face. Accordingly, one skilled in the art will recognize the instant example is for ease of illustration only.

If the processing platform 205 detects the face (e.g., via object detection module 216, IPU 218, 218A) in the lower resolution image data 270 and the face meets a predetermined condition (e.g., the face is detected but not identified), the processing platform 205 (e.g., via object detection module 216, IPU 218, 218A) may subsequently determine a region of interest in the one or more lower resolution images of the lower resolution image data 270 corresponding to the object of interest/face. As previously described with the gum example, the region of interest may already be known based upon the event signal. For example, the processing platform 205 may have captured initial image data via the second imaging assembly 202, and the processing platform 205 (e.g., via object detection module 216, IPU 218, 218A) may detect and/or identify an object in the initial image data which indicates facial recognition, and subsequently may determine a corresponding region of interest in other images/image data, e.g., images/image data 260, lower resolution image data 270, cropped image data 280, etc. This may include detecting and/or identifying an object which may be a human and/or face indicating facial recognition, detecting and/or identifying an object which results in an event signal indicating facial recognition (e.g., a decoding an indicia for alcohol wherein the face of the purchaser may be beneficial to ensure they are of an adequate age to make the purchase), or any other suitable means of indicating facial recognition.

In at least some aspects, the processing platform 205 may then access the image data 260 of the one or more images captured by the first imaging assembly 202 (e.g., images at full resolution stored as captured image data 212) from the memory 210. The processing platform 205 may then generate (e.g., via processor 220, IPU 218, 218A or other suitable component) cropped image data 280 by cropping the one or more images to include the region of interest, e.g., the region associated with the face detected, but not identified, in the images.

At the third time frame 256, the processing platform 205 may analyze the cropped image data 280 (e.g., via object detection module 216, IPU 218, 218A) to determine information corresponding to the face. For example, this may include determining the identity of the person, determining the cropped image data 280 is of a quality that the person may be identified based upon their face, determining a theft occurred, determining the person identified is the thief, or any other suitable determination. The processing platform 205 may subsequently transmit a message 290 to a host such as host 235, the message 290 being based at least in part on the information corresponding to the object of interest, e.g., a message 290 indicating a positive identification of a person of interest who may be a thief, that a face of a person who may potentially be a thief has been captured, that no theft occurred, that the face of a potential thief was not captured, or any other suitable message 290.

As illustrated above, the workflow block diagram 250 has various use cases, as well as others which have not been described. Accordingly, the above examples are described for ease of illustration only, and one skilled in the art will understand that other use cases and/or examples within the techniques of the systems and methods described herein are possible. For example, in some aspects, the event signal may indicate an event other than ticket switching and/or loss prevention. In some aspects, the event signal may indicate more than one event, more than one object of interest, and/or more than one region of interest, etc.

FIG. 3 illustrates a flow diagram of an example method 300 for operating an indicia reader 100 such as indicia reader 100, in accordance with embodiments disclosed herein. The method 300 may include capturing by a first imaging assembly, such as first imaging assembly 202, one or more images comprising image data such as image data 260 of a FOV of the first imaging assembly (block 302).

The method 300 may include storing the image data in a memory associated with the indicia reader (block 304), such as memory 210.

The method 300 may include generating one or more lower resolution images comprising lower resolution image data, such as lower resolution image data 270, corresponding to the one or more images comprising image data (block 306). In at least some embodiments of method 300, generating the one or more lower resolution images (block 306) may include binning pixels of the one or more images, or any other suitable method.

The method 300 may include analyzing the lower resolution image data to detect an object of interest (block 308). In at least some embodiments of method 300, detecting the object of interest may occur locally on the indicia reader, e.g., via a IPU such as IPU 218, an object identification module such as object identification module 216, or other suitable component local to the indicia reader, as well as non-local components such as via IPU 218A.

The method 300 may include determining a region of interest in the one or more lower resolution images of the lower resolution image data corresponding to the object of interest based upon detecting the object of interest (block 310), and having the object of interest meet a predetermined condition, such as the object not being identified, or any other suitable condition. In at least some embodiments of method 300, determining the region of interest (block 310) may include detecting the object of interest in the lower resolution image data using one or more of edge detection, pattern matching, segmentation, color analysis, optical character recognition, or blob detection.

The method 300 may include accessing the image data of the one or more images from the memory based upon determining the region of interest (block 312).

The method 300 may include generating cropped image data, such as cropped image data 280, by cropping the one or more images to include the region of interest (block 314). In at least some embodiments, the method 300 may include obtaining cropping parameters used to generate the cropped image data. In at least some aspects, the cropping parameters may be obtained from memory such as memory 210, a host such as host 235, a server such as server 245, from a machine learning model or other artificial intelligence, or in any other suitable manner The method 300 may include analyzing the cropped image data to determine information corresponding to the object of interest (block 316). In at least some embodiments, analyzing the cropped image data (block 316) may further include decoding an indicia associated with the object of interest in the cropped image data resulting in a decoded indicia value; and transmitting the decoded indicia value to the host, such as host 235.

The method 300 may include transmitting a message (e.g., message 290) to a host, the message being based at least in part on the information corresponding to the object of interest (block 318).

In at least some embodiments, method 300 may include at least two processors, such as processor 220, which are communicatively coupled. In at least some embodiments of method 300, at least one processor is an image processing unit. In at least some embodiments of method 300, at least one processor is a logical processor or a physical processor.

In at least some embodiments, method 300 may include capturing one or more initial images comprising initial image data of the object of interest by a second imaging assembly, such as second imaging assembly 204, having a second FOV which at least partially overlaps the FOV of the first imaging assembly; analyzing the initial image data to decode an indicia associated with the object of interest in the initial image data resulting in a decoded indicia value; and based upon the decoded indicia value, generating a message indicating ticket switching, and determining the region of interest is proximate the indicia.

In at least some embodiments, method 300 may include analyzing the region of interest in the image data of the one or more images to determine information corresponding to the object of interest. For example, the entirety of an image captured by the first imaging assembly at full resolution may be useful for one or more purposes. Accordingly, the one or more processors may analyze the image data captured by the first imaging assembly (e.g., full resolution images which have not been cropped), to determine a region of interest, or any other suitable determination and/or function, such as object recognition, facial recognition, indicia decoding, etc.

It should be understood that not all blocks of the exemplary flow diagram of method 300 are required to be performed, nor are they required to be performed in the order described and/or presented in FIG. 3.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The invention claimed is:

1. A system for operating an indicia reader, the system comprising:
    a first imaging assembly having a first field of view configured to capture one or more first images comprising first image data;
    a second imaging assembly having a second field of view which at least partially overlaps the first field of view and is configured to capture one or more second images comprising second image data;
    one or more processors; and
    a memory associated with the indicia reader storing instructions that, when executed by the one or more processors, cause the indicia reader to:
    capture the one or more first images;
    store the first image data in the memory;
    generate one or more lower resolution images comprising lower resolution image data corresponding to the one or more first images comprising first image data;
    analyze the lower resolution image data to detect an object of interest;
    in response to detecting the object of interest and having the object of interest meet a predetermined condition, determine a region of interest in the one or more lower resolution images of the lower resolution image data corresponding to the object of interest;
    in response to determining the region of interest, access the first image data of the one or more first images from the memory;
    generate cropped image data by cropping the one or more first images to include the region of interest;
    analyze the cropped image data to determine information corresponding to the object of interest;
    capture the one or more second images of the object of interest;
    analyze the second image data to decode an indicia associated with the object of interest in the second image data resulting in a decoded indicia value; and
    responsive to the information corresponding to the object of interest and the decoded indicia value having a mismatch, and the region of interest being proximate the indicia, generate a message indicating ticket switching.

2. The system of claim 1, further comprising at least two processors which are communicatively coupled, wherein at least one processor is an image processing unit.

3. The system of claim 1, wherein the predetermined condition is an unsuccessful identification of the object.

4. The system of claim 1, wherein to generate the one or more lower resolution images, the one or more processors are further configured to bin pixels of the one or more first images.

5. The system of claim 1, wherein the one or more processors are further configured to obtain cropping parameters used to generate the cropped image data.

6. The system of claim 1, wherein the one or more processors are further configured to analyze the region of interest in the image data of the one or more first images to determine information corresponding to the object of interest.

7. The system of claim 1, wherein to determine a region of interest in the one or more lower resolution images, the one or more processors are further configured to detect the object of interest in the lower resolution image data using one or more of edge detection, pattern matching, segmentation, color analysis, optical character recognition, or blob detection.

8. The system of claim 1, wherein to analyze the cropped image data to determine information corresponding to the object of interest, the one or more processors are further configured to:
    decode an indicia associated with the object of interest in the cropped image data resulting in a decoded indicia value; and
    transmit the decoded indicia value to the host.

9. A method for operating an indicia reader, the method comprising:
    capturing by a first imaging assembly, one or more first images comprising first image data of a first field of view of the first imaging assembly;
    storing the first image data in a memory associated with the indicia reader;
    generating one or more lower resolution images comprising lower resolution image data corresponding to the one or more first images comprising first image data;
    analyzing the lower resolution image data to detect an object of interest;
    determining a region of interest in the one or more lower resolution images of the lower resolution image data corresponding to the object of interest based upon detecting the object of interest and having the object of interest meet a predetermined condition;
    accessing the image data of the one or more first images from the memory based upon determining the region of interest;
    generating cropped image data by cropping the one or more first images to include the region of interest;
    analyzing the cropped image data to determine information corresponding to the object of interest;
    capturing one or more second images comprising second image data of the object of interest by a second imaging assembly having a second field of view which at least partially overlaps the field of view;
    analyzing the second image data to decode an indicia associated with the object of interest in the second image data resulting in a decoded indicia value; and
    responsive to the information corresponding to the object of interest and the decoded indicia value having a mismatch, and the region of interest being proximate the indicia, generate a message indicating ticket switching.

10. The method of claim 9, further comprising at least two processors which are communicatively coupled, wherein at least one processor is an image processing unit.

11. The method of claim 9, wherein the predetermined condition is an unsuccessful identification of the object.

12. The method of claim 9, wherein generating the one or more lower resolution images further comprises binning pixels of the one or more images.

13. The method of claim 9, further comprising obtaining cropping parameters used to generate the cropped image data.

14. The method of claim 9, further comprising analyzing the region of interest in the first image data of the one or more first images to determine information corresponding to the object of interest.

15. The method of claim 9, wherein determining a region of interest in the one or more lower resolution images further comprises detecting the object of interest in the lower resolution image data using one or more of edge detection, pattern matching, segmentation, color analysis, optical character recognition, or blob detection.

16. The method of claim 9, wherein identifying the object of interest occurs locally on the indicia reader.

17. The method of claim 9, wherein analyzing the cropped image data to determine information corresponding to the object of interest further comprises:

decoding an indicia associated with the object of interest in the cropped image data resulting in a decoded indicia value; and transmitting the decoded indicia value to the host.

* * * * *